US011325928B2

United States Patent
Mariott et al.

(10) Patent No.: US 11,325,928 B2
(45) Date of Patent: May 10, 2022

(54) MODIFIED SPRAY-DRIED ZIEGLER-NATTA (PRO)CATALYST SYSTEMS

(71) Applicant: Univation Technologies, LLC, Houston, TX (US)

(72) Inventors: Wesley R. Mariott, Manvel, TX (US); C. Dale Lester, South Charleston, WV (US); Phuong A. Cao, Middlesex, NJ (US); Michael D. Awe, Middlesex, NJ (US); Nitin Borse, Pearland, TX (US)

(73) Assignee: UNIVATION TECHNOLOGIES, LLC

( * ) Notice: Subject to any disclaimer, the term of this patent is extended or adjusted under 35 U.S.C. 154(b) by 6 days.

(21) Appl. No.: 16/769,271

(22) PCT Filed: Dec. 3, 2018

(86) PCT No.: PCT/US2018/063559
§ 371 (c)(1),
(2) Date: Jun. 3, 2020

(87) PCT Pub. No.: WO2019/112929
PCT Pub. Date: Jun. 13, 2019

(65) Prior Publication Data
US 2020/0369693 A1     Nov. 26, 2020

Related U.S. Application Data

(60) Provisional application No. 62/594,691, filed on Dec. 5, 2017.

(51) Int. Cl.
*C08F 4/655* (2006.01)
*C08F 4/654* (2006.01)
*C07F 7/28* (2006.01)
*C08F 210/16* (2006.01)

(52) U.S. Cl.
CPC .............. *C07F 7/28* (2013.01); *C08F 210/16* (2013.01); *C08F 4/655* (2013.01); *C08F 4/6543* (2013.01); *C08F 4/6555* (2013.01)

(58) Field of Classification Search
CPC ...... C08F 4/6555; C08F 4/6557; C08F 4/655; C08F 4/6543
See application file for complete search history.

(56) References Cited

U.S. PATENT DOCUMENTS

| | | |
|---|---|---|
| 3,324,095 A | 6/1967 | Carrick et al. |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,399,054 A | 8/1983 | Ferraris et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,008,204 A | 4/1991 | Stehling |
| 5,290,745 A | 3/1994 | Jorgensen et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,489,408 B2 | 12/2002 | Mawson et al. |
| 6,780,808 B2 * | 8/2004 | Wagner ................... C07F 3/003 502/103 |
| 6,806,221 B2 * | 10/2004 | Wagner ................... C08F 10/02 502/103 |
| 6,855,655 B2 * | 2/2005 | Wagner ................. C08F 110/02 502/118 |
| 6,982,237 B2 * | 1/2006 | Wagner ................... C08F 10/00 502/125 |
| 2004/0009869 A1 | 1/2004 | Wagner et al. |
| 2004/0010101 A1 | 1/2004 | Wagner et al. |
| 2004/0138054 A1 | 7/2004 | Wagner et al. |
| 2006/0173123 A1 | 8/2006 | Yang et al. |
| 2016/0347892 A1 | 12/2016 | Conti et al. |

FOREIGN PATENT DOCUMENTS

| | | |
|---|---|---|
| BE | 839380 | 9/1976 |
| EP | 0794200 | 9/1997 |
| EP | 0634421 B1 | 10/1997 |
| EP | 0802202 | 10/1997 |
| EP | 1572756 | 7/2004 |
| EP | 1891125 B1 | 2/2008 |
| WO | 1993003093 | 2/1993 |
| WO | 2004055065 | 7/2004 |
| WO | 2006138036 | 12/2006 |
| WO | 2009124722 | 10/2009 |
| WO | 2010125018 | 11/2010 |
| WO | 2016207270 | 12/2016 |
| WO | 2017151592 | 9/2017 |

OTHER PUBLICATIONS

Senso, The Influence of Mixed Activators on Ethylene Polymerization and Ethylene/1-Hexene Copolymerization with Silica-Supported Ziegler-Natta Catalyst, Molecules, 2010, pp. 9323-9339, vol. 15.
Wild, Determination of Branching Distributions in Polyethylene and Ethylene Copolymers, Journal of Polymer Science: Polymer Physics Edition, 1982, pp. 441-455, vol. 20.

\* cited by examiner

*Primary Examiner* — Rip A Lee

(57) ABSTRACT

A modified spray-dried Ziegler-Natta (pro)catalyst system comprising a Ziegler-Natta (pro)catalyst, a carrier material, and a tetrahydrofuran/ethanol modifier; polyolefins; methods of making and using same; and articles containing same.

10 Claims, No Drawings

MODIFIED SPRAY-DRIED ZIEGLER-NATTA (PRO)CATALYST SYSTEMS

FIELD

Titanium-based Ziegler-Natta (pro)catalysts, polyolefins, methods of making and using same, and articles containing same.

INTRODUCTION

Ziegler-Natta (pro)catalysts may be based on titanium or vanadium. A typical Ziegler-Natta procatalyst comprises a complex of $TiCl_3$ and $MgCl_2$. The $MgCl_2$ is a divided solid that has high surface area and also functions as a support material.

A typical Ziegler-Natta procatalyst system comprises the Ziegler-Natta procatalyst and at least one additional component other than a reducing agent or activator. Examples of the at least one additional component are an organic modifier and a carrier material.

A typical Ziegler-Natta catalyst system comprises a Ziegler-Natta catalyst comprising a reaction product of, sequentially, a chemical reduction and a chemical activation of the Ziegler-Natta procatalyst system. Thus, the Ziegler-Natta catalyst system is made by contacting the Ziegler-Natta procatalyst system with a reducing agent effective for chemically reducing the Ziegler-Natta procatalyst system so as to make a chemical reduction product, and then contacting the chemical reduction product with an activator to increase catalytic activity thereof and make the Ziegler-Natta catalyst system.

In Ziegler-Natta catalyst systems the Ziegler-Natta catalyst may enhance rates of polymerization of olefin monomer(s). The organic modifier may attenuate the catalytic activity or selectivity of the Ziegler-Natta catalyst, such as a function of reaction temperature, or may alter the composition or reactivity of the activator. The carrier material typically defines size and shape of, and controls access of monomer to, the Ziegler-Natta catalyst. The function of the carrier material may vary from catalyst system to catalyst system depending on how the catalyst system is constructed, which in turn largely depends upon how the catalyst system is made and the composition and features of the carrier material.

The carrier material is a divided solid and is different in composition from those of the titanium halide and support material. The carrier material may be an alumina, a clay, or a silica. The carrier material may be porous, such as mesoporous, and thus may define exterior surfaces (outside of pores) and interior surfaces (inside pores). Ziegler-Natta catalyst systems that comprise the Ziegler-Natta catalyst and the carrier material may be classified according to features such as the size, shape and location of the Ziegler-Natta catalyst therein. In turn these features may be controlled according to the composition of the carrier material and the method of preparation of the Ziegler-Natta catalyst system.

In supported Ziegler-Natta catalyst systems the carrier material may be mesoporous spheres of amorphous porous silica, wherein the interior and exterior surfaces are hydrophilic. The supported Ziegler-Natta catalyst systems, such as in U.S. Pat. No. 6,982,237 B2, generally may be made by a concentrating method comprising suspending a porous silica in a tetrahydrofuran solution of the titanium chloride and magnesium chloride to form a mixture, and then concentrating the mixture under vacuum to give a supported Ziegler-Natta procatalyst system, which may be subsequently reduced and activated. It is believed that the concentrating method results in the Ziegler-Natta procatalyst being precipitated inside the pores of the porous silica, and after the chemically reducing and activating steps the pores contain most or all of the Ziegler-Natta catalyst. Thus without wishing to be bound by theory, it is believed that the pores of the porous silica largely define the size and shape of, and control monomer access to the Ziegler-Natta catalyst in supported Ziegler-Natta catalyst systems. During polymerizations, ethylene and/or alpha-olefin may enter the pores of the porous silica in order to contact the Ziegler-Natta catalyst therein, and growth of polymer therein may be restricted by the mesopore diameters and pore volume. Commercial supported Ziegler-Natta catalyst systems include UCAT™ A from Univation Technologies, LLC.

In spray-dried Ziegler-Natta catalyst systems, the carrier material may be a hydrophobic pre-treated fumed silica, wherein the interior and exterior surfaces are hydrophobic. The spray-dried Ziegler-Natta catalyst systems may be made by a spray-drying method comprising suspending a hydrophobic pre-treated silica (pre-treated with a hydrophobing agent) in a tetrahydrofuran solution of the Ziegler-Natta procatalyst to form a mixture, and spray-drying the mixture to give a spray-dried Ziegler-Natta procatalyst system, which may be subsequently reduced and activated. It is believed that the spray-drying method results in the hydrophobic pores containing relatively little or none of the Ziegler-Natta catalyst, which instead largely resides on the exterior surfaces. Thus without wishing to be bound by theory, it is believed that the exterior surfaces largely define the size and shape of, and control monomer access to, the Ziegler-Natta catalyst in spray-dried Ziegler-Natta catalyst systems. During polymerizations, ethylene and/or alpha-olefin may contact the Ziegler-Natta catalyst on the exterior surface of the silica, a polymer produced thereon may grow largely unrestricted by pore dimensions. Commercial spray-dried Ziegler-Natta catalyst systems include UCAT™ J from Univation Technologies, LLC.

Thus, knowledge about supported Ziegler-Natta (pro) catalyst systems is not necessarily predictive of, or applicable to, spray-dried Ziegler-Natta (pro)catalyst systems, and vice versa.

SUMMARY

We provide modified, titanium-based, spray-dried Ziegler-Natta (pro)catalyst systems containing titanium-based Ziegler-Natta (pro)catalysts, a carrier material, and a tetrahydrofuran/ethanol modifier. The inventive catalyst system may be used to enhance the polymerization reaction rate of a chemical process for manufacturing a polyolefin composition. We also provide a method of making the inventive (pro)catalyst systems, a method of polymerizing olefin (co) monomer(s), polyolefins made by the method, and manufactured articles containing or made from the polyolefins. The polymerization may be conducted in a gas phase or a liquid-phase.

DETAILED DESCRIPTION

The Introduction, Summary and Abstract are incorporated here by reference.

Certain inventive embodiments are described below as numbered aspects for easy cross-referencing. Additional embodiments are described elsewhere herein.

Aspect 1. A modified spray-dried Ziegler-Natta procatalyst system comprising a product of spray-drying a slurry of (A⁺) a modified Ziegler-Natta procatalyst system and (B) a hydrophobic pre-treated fumed silica (substantially nonporous, alternatively completely nonporous); wherein the (A⁺) modified Ziegler-Natta procatalyst system comprises a complex of TiCl₃ and MgCl₂ and an effective amount of (C) a tetrahydrofuran/ethanol modifier, wherein the (C) tetrahydrofuran/ethanol modifier has a THF/EtOH weight/weight ratio of from 20:80 to 80:20. The titanium of the modified spray-dried Ziegler-Natta procatalyst system may be formally Ti⁺³. In some aspects the modified spray-dried Ziegler-Natta procatalyst system is made by spray-drying same from an excess of tetrahydrofuran and ethanol until a dried particulate solid of constant weight is obtained. In some aspects the (A⁺) a modified Ziegler-Natta procatalyst system is made by contacting TiCl₄ and Mg metal in a first amount of dried tetrahydrofuran to give a first titanium complex containing the tetrahydrofuran, but free of ethanol. Then a second amount of dried ethanol is added to the first titanium complex to give the (A⁺) modified Ziegler-Natta procatalyst system, wherein the first amount of dried tetrahydrofuran and the second amount of dried ethanol are chosen so as to give the THF/EtOH weight/weight ratio of from 20:80 to 80:20. In some aspects a slurry of constituents (A⁺) and (B) is made by a first process comprising heating at a first temperature and for a first period of time TiCl₄ and Mg metal in the first amount of anhydrous tetrahydrofuran to give a first solution of the complex of TiCl₃ and MgCl₂ in the first amount of anhydrous tetrahydrofuran, then adding the second amount of dried ethanol to the first solution to give a second solution of the (A⁺) modified Ziegler-Natta procatalyst system in anhydrous (C) tetrahydrofuran/ethanol modifier, then adding finely-divided solid MgCl₂ to the second solution to give suspension of MgCl₂ in the second solution of the complex of TiCl₃ and anhydrous (C) tetrahydrofuran/ethanol modifier, heating at a second temperature and for a second period of time the suspension until the finely-divided solid MgCl₂ dissolves to give a third solution of the complex of TiCl₃ and MgCl₂ and added MgCl₂ in the anhydrous (C) tetrahydrofuran/ethanol modifier, and adding the (B) hydrophobic pre-treated fumed silica to the third solution at a third temperature to give the slurry of constituent (B) in the third solution. In other aspects the titanium complex is made from TiCl₃.AA and MgCl₂. The "TiCl₃.AA" means a mixture of a 3:1 molar ratio of TiCl₃/AlCl₃, which may be obtained from a commercial supplier or may be made by a reaction of 3 mole equivalents of TiCl₄ with one mole equivalent of aluminum (Al) metal (Al°), which acts as a reducing agent, in a solvent, such as anhydrous tetrahydrofuran. In other aspects the titanium complex is made from TiCl₃.AA and MgCl₂ and the slurry of constituents (A⁺) and (B) is made by a second process comprising heating at a first temperature and for a second period of time finely-divided solid MgCl₂ in anhydrous (C) tetrahydrofuran/ethanol modifier to give a fourth solution of the MgCl₂ in the anhydrous (C) tetrahydrofuran/ethanol modifier, adding TiCl₃.AA to the fourth solution at a third temperature and mixing for a first period of time to give a fifth solution of a complex of TiCl₃.AA and MgCl₂ and additional MgCl₂ in the anhydrous (C) tetrahydrofuran/ethanol modifier, and adding the (B) hydrophobic pre-treated fumed silica to the fifth solution at a third temperature to give the slurry of constituents (A⁺) and (B). The slurry made by the first or second process may be mixed for a third period of time before being spray-dried to give the modified spray-dried Ziegler-Natta procatalyst system. Suitable spray-drying conditions are described later in the Examples. The first and second temperatures independently may be from 30 degrees Celsius (° C.) to the boiling point of constituent (C), alternatively from 50° to 65° C., alternatively from 58° to 62° C., alternatively 60° C. The first period of time may be from 10 to 120 minutes, alternatively from 45 to 90 minutes, alternatively from 50 to 70 minutes, alternatively 60 minutes. The second period of time may be from 1 to 48 hours, alternatively from 3 to 30 hours, alternatively from 4 to 12 hours, alternatively 5 hours. The third temperature may be from 30° to 55° C., alternatively from 35° to 50° C., alternatively from 35° to 45° C., alternatively from 40° to 45° C. The third period of time may be from 5 to 60 minutes, alternatively from 10 to 45 minutes, alternatively from 20 to 40 minutes, alternatively 30 minutes. In the first process, measured amounts of the TiCl₄ and Mg metal may be added to a measured first amount of the anhydrous tetrahydrofuran in a vessel. For enhanced performance of the ultimately made (A*) activated Ziegler-Natta catalyst comprising a complex of TiCl₃ and MgCl₂ (see below), in the first process the addition of TiCl₄ and Mg metal and the subsequent heating at the first temperature to form the first solution are performed before a measured second amount of dried ethanol is added to form the (C) tetrahydrofuran/ethanol modifier, and then a measured amount of the finely-divided solid MgCl₂ is added thereto. If, in a variant of the first process, anhydrous ethanol is added before the TiCl₄ and Mg metal are allowed to react to form the complex of TiCl₃ and MgCl₂ in the first amount of anhydrous tetrahydrofuran, the performance of the ultimately made (A*) activated Ziegler-Natta catalyst comprising a complex of TiCl₃ and MgCl₂ (see below) may not be enhanced. If, in a variant of the first process, the finely-divided solid MgCl₂ is added to the anhydrous (C) tetrahydrofuran/ethanol modifier before the TiCl₄ and Mg metal are added to the anhydrous (C) tetrahydrofuran/ethanol modifier, the performance of the ultimately made (A*) activated Ziegler-Natta catalyst comprising a complex of TiCl₃ and MgCl₂ (see below) may not be enhanced. Carrier material of the modified spray-dried Ziegler-Natta procatalyst system consists essentially of, alternatively consists of, the (B) hydrophobic pre-treated fumed silica, which means it contains from 0 to 5 weight percent (wt %), alternatively 0 to 0.9 wt %, alternatively 0 to 0.09 wt %, alternatively 0 wt % porous silica. Without wishing to be bound by theory, we believe that the exterior surfaces of the hydrophobic pre-treated fumed silica largely define the construction of the modified spray-dried Ziegler-Natta procatalyst system.

Aspect 2. The modified spray-dried Ziegler-Natta procatalyst system of aspect 1 wherein the (C) tetrahydrofuran/ethanol modifier has a THF/EtOH weight/weight ratio of from 25:75 to 75:25, alternatively from 30.0:70.0 to 70.0:30.0, alternatively from 35:65 to 65:35, alternatively from 40.0:60.0 to 60.0:40.0, alternatively from 45:55 to 55:45, alternatively from 47:53 to 53:47, alternatively 50:50.

Aspect 3. The modified spray-dried Ziegler-Natta procatalyst system of aspect 1 or 2 further described by any one or limitations (i) to (vi): (i) the titanium complex is made from TiCl₄ and Mg metal; (ii) the titanium complex is made from TiCl₃.AA and MgCl₂; (iii) the slurry of constituents (A) and (B) is made by the first process; (iv) the (B) hydrophobic pre-treated fumed silica is a product of pre-treating an untreated fumed silica with a silicon-based hydrophobing agent; (v) the hydrophobic pre-treated fumed silica is a product of pre-treating an untreated fumed silica with a silicon-based hydrophobing agent selected from trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof; and (vi) both (ii) and (v). Examples of the hydrophobic treated fumed silica are CAB-O-SIL hydrophobic fumed silicas available from Cabot Corporation, Alpharetta Ga., USA.

Aspect 4. A method of making the modified spray-dried Ziegler-Natta procatalyst system of any one of aspects 1 to 3, the method comprising spray-drying the slurry of constituents ($A^+$) and (B) to give the modified spray-dried Ziegler-Natta procatalyst system; wherein in the slurry the (C) tetrahydrofuran/ethanol modifier has a THF/EtOH weight/weight ratio of from 20:80 to 80:20. It is believed that the THF/EtOH weight/weight ratio of the modified spray-dried Ziegler-Natta procatalyst system made by the method is the same as the THF/EtOH weight/weight ratio used in the solution of the method. The modified spray-dried Ziegler-Natta procatalyst system of any one of the preceding aspects has not yet been contacted with a reducing agent effective for chemically reducing a complex of $TiCl_3$ and $MgCl_2$ so as to make a chemical reduction product. In some aspects the method further comprises the method of making the modified spray-dried Ziegler-Natta procatalyst system described above for Aspect 1.

Aspect 5. A method of reducing a modified spray-dried Ziegler-Natta catalyst system of, the method comprising contacting the modified spray-dried Ziegler-Natta procatalyst system of any one of aspects 1 to 3, or the modified spray-dried Ziegler-Natta procatalyst system made by the method of aspect 4, with a reducing agent effective for chemically reducing a complex of $TiCl_3$ and $MgCl_2$, thereby giving a chemically-reduced, modified spray-dried Ziegler-Natta procatalyst system. The chemically-reduced, modified spray-dried Ziegler-Natta procatalyst system comprises ($A^{red}$) a reduced Ziegler-Natta procatalyst and the (B) hydrophobic pre-treated fumed silica. The reducing agent may comprise trihexylaluminum, diethylaluminum chloride, or, typically, a combination of trihexylaluminum and diethylaluminum chloride. The reduction reaction may be run under an inert gas atmosphere and in a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof. The chemically-reduced, modified spray-dried Ziegler-Natta procatalyst system may be dried by removing the saturated and/or aromatic hydrocarbon solvent therefrom. Without wishing to be bound by theory, we believe that the exterior surfaces of the hydrophobic pre-treated fumed silica largely define the construction of the ($A^{red}$) reduced Ziegler-Natta procatalyst.

Aspect 6. A chemically-reduced, modified spray-dried Ziegler-Natta procatalyst system prepared by the method of aspect 5. The term "spray-dried" is used in aspects 6 and 7 in the conventional, art recognized sense that construction of the ($A^{red}$) reduced Ziegler-Natta procatalyst is derived from the effects of a prior step of spray-drying.

Aspect 7. A method of activating a chemically-reduced, modified spray-dried Ziegler-Natta procatalyst system, the method comprising contacting the chemically-reduced, modified spray-dried Ziegler-Natta procatalyst system of aspect 6 with an activator, thereby making a modified spray-dried Ziegler-Natta catalyst system. The modified spray-dried Ziegler-Natta catalyst system comprises ($A^*$) a modified Ziegler-Natta catalyst and the (B) hydrophobic pre-treated fumed silica. The activator may comprise one or more alkylaluminum compounds such as a combination of diethylaluminum chloride and triethylaluminum. The activation reaction may be run under an inert gas atmosphere and in a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof. The saturated and/or aromatic hydrocarbon solvent used in the activating reaction may be the same as or different than the saturated and/or aromatic hydrocarbon solvent used in the reducing reaction of the prior aspect. The activating reaction may use the reaction mixture made in the reduction reaction of the previous aspect and may be run in the same reactor as the reduction reaction. The resulting modified spray-dried Ziegler-Natta catalyst system comprising the ($A^*$) activated Ziegler-Natta catalyst may then be fed into a polymerization reactor, such as the polymerization reactor used in the below method of making a polyethylene composition. Alternatively, the activating reaction may be run in the polymerization reactor, which may accomplished by introducing via a first feedline into the polymerization reactor a first feed of the reaction mixture made in the reduction reaction and, separately, introducing via a second feedline into the polymerization reactor a second feed of the activator, thereby making the modified spray-dried Ziegler-Natta catalyst system comprising the ($A^*$) activated Ziegler-Natta catalyst in situ in the polymerization reactor, wherein the first and second feed lines are different and introduce their respective feeds at different feed points in the polymerization reactor. Alternatively, the activating reaction may be accomplished by introducing into a co-feedline, which downstream is entering the polymerization reactor, the first feed of the reaction mixture made in the reduction reaction and the second feed of the activator, which may start the making of the modified spray-dried Ziegler-Natta catalyst system comprising the ($A^*$) activated Ziegler-Natta catalyst in situ in the co-feedline, and then co-feeding the resulting mixture of the reaction mixture made in the reduction reaction and the activator, and any such activated catalyst system made in the co-feedline, from the co-feedline into the polymerization reactor, thereby making the modified spray-dried Ziegler-Natta catalyst system in the polymerization reactor. The modified spray-dried Ziegler-Natta catalyst system may be dried by removing the saturated and/or aromatic hydrocarbon solvent therefrom. Without wishing to be bound by theory, we believe that the exterior surfaces of the hydrophobic pre-treated fumed silica largely define the construction of the ($A^*$) activated Ziegler-Natta catalyst in the modified spray-dried Ziegler-Natta catalyst system.

Aspect 8. A modified spray-dried Ziegler-Natta catalyst system made by the method of aspect 7. The modified spray-dried Ziegler-Natta catalyst system has at least 10 fold higher catalytic activity and/or polymer productivity per unit catalyst weight than does the aforementioned chemically-reduced, modified spray-dried Ziegler-Natta procatalyst system. The term "spray-dried" is used in aspects 7 and 8 in the conventional, art recognized sense that construction of the modified spray-dried Ziegler-Natta catalyst is derived from the effects carried through from a prior step of spray-drying.

Aspect 9. A method of making a polyethylene composition, the method comprising contacting ethylene (monomer) and optionally zero, one, or more ($C_3$-$C_{20}$)alpha-olefin (comonomer(s)) with the modified spray-dried Ziegler-Natta catalyst system of aspect 9 to give a polyethylene composition comprising a polyethylene homopolymer or ethylene/($C_3$-$C_{20}$)alpha-olefin copolymer, respectively, and the modified spray-dried Ziegler-Natta catalyst system, or a by-product thereof. The polyethylene homopolymer contains constituent units that are derived from ethylene. The ethylene/($C_3$-$C_{20}$)alpha-olefin copolymer contains monomeric constituent units that are derived from ethylene and comonomeric constituent units that are derived from one or more ($C_3$-$C_{20}$)alpha-olefin comonomer(s), respectively. In some aspects the method comprises copolymerizing ethylene and one or more ($C_3$-$C_{20}$)alpha-olefin (comonomer(s)) to give the ethylene/($C_3$-$C_{20}$)alpha-olefin copolymer composition. The ($C_3$-$C_{20}$) alpha-olefin-derived comonomeric constituent units may be derived from 1-butene; alternatively 1-hexene; alternatively 1-octene; alternatively a combination of any two thereof.

Aspect 10. The method of aspect 9 comprising a gas phase polymerization in the presence of molecular hydrogen gas ($H_2$) and, optionally, an induced condensing agent (ICA) in one, two or more gas phase polymerization reactors under (co)polymerizing conditions, thereby making the polyethylene composition; wherein the (co)polymerizing conditions comprise a reaction temperature from 80 degrees (°) to 110° Celsius (C.); a molar ratio of the molecular hydrogen gas to the ethylene ($H_2$/$C_2$ molar ratio) from 0.001 to 0.050; and a molar ratio of the comonomer to the ethylene (Comonomer/$C_2$ molar ratio) from 0.005 to 0.10.

Aspect 11. A polyethylene composition made by the method of aspect 9 or 10.

Aspect 12. A manufactured article comprising a shaped form of the polyethylene composition of aspect 11. The manufactured article may be selected from: coatings, films, sheets, extruded articles, and injection molded articles. The manufactured article may be a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

The modified spray-dried Ziegler-Natta procatalyst system; chemically-reduced, modified spray-dried Ziegler-Natta procatalyst system; and modified spray-dried Ziegler-Natta catalyst system independently may be characterized by any one of limitations (i) to (x): (i) a Mg atom loading of from 2.0 to 10.0 weight percent (wt %), alternatively from 6.0 to 8.5 wt %, alternatively from 6.5 to 8.0 wt %, based on total weight of the ad rem system; (ii) a Mg atom concentration of from 0.82 to 4.11 millimoles Mg atom per gram of the ad rem system (mmol/g), alternatively from 2.0 to 4.0 mmol/g, alternatively 2.47 to 3.50 mmol/g, alternatively from 2.67 to 3.29 mmol/g; (iii) a Ti atom loading of from 0.5 to 5.0 wt %, alternatively from 1.0 to 4.0 wt %, alternatively from 1.5 to 3.5 wt %, based on total weight of the ad rem system; (iv) a Ti atom concentration of from 0.10 to 1.04 millimoles Ti atom per gram of the ad rem system (mmol/g), alternatively from 0.21 to 0.84 mmol/g, alternatively from 0.25 to 0.80 mmol/g, alternatively from 0.31 to 0.73 mmol/g; (v) a Mg atom-to-Ti atom molar ratio from 0.79 to 39.4, alternatively from 2.95 to 16.7, alternatively from 3.0 to 15, alternatively from 3.66 to 10.5; (vi) a loading of the tetrahydrofuran/ethanol modifier of from 15 to 45 wt %, alternatively from 18 to 39 wt %, alternatively from 20.0 to 35.0 wt %; (vii) both (i) and (ii); (viii) both (i) and (iii); (ix) both (i) and (iv); (x) both (i) and (v); (xi) both (i) and (vi); (xii) both (ii) and (iii); (xiii) both (ii) and (iv); (xiv) both (ii) and (v); (xv) both (ii) and (vi); (xvi) both (iii) and (iv); (xvii) both (iii) and (v); (xviii) both (iii) and (vi); (xix) both (iv) and (v); (xx) both (iv) and (vi); (xxi) both (v) and (vi); (xxii) both (vii) and any one of (viii) to (xxi); (xxiii) both (viii) and any one of (ix) to (xxi); (xxiv) both (ix) and any one of (x) to (xxi); (xxv) both (x) and any one of (xi) to (xxi); (xxvi) both (xi) and any one of (xii) to (xxi); (xxvii) both (xii) and any one of (xiii) to (xxi); (xxviii) both (xiii) and any one of (xiv) to (xxi); (xxix) both (xiv) and any one of (xv) to (xxi); (xxx) both (xv) and any one of (xvi) to (xxi); (xxxi) both (xvi) and any one of (xvii) to (xxi); (xxxii) both (xvii) and any one of (xviii) to (xxi); (xxxiii) both (xviii) and any one of (xix) to (xxi); (xxxiv) both (xix) and any one of (xx) and (xxi); (xxiv) both (xx) and (xxi).

First catalyst productivity improvement. All other things being equal, the inventive modified spray-dried Ziegler-Natta catalyst system (inventive catalyst system) may have greater catalytic activity per unit weight of catalyst system and/or greater polymer productivity rate (kilograms polymer produced per hour) than would a comparative supported Ziegler-Natta catalyst system having the same constituents and being prepared by a concentrating method instead of the present spray-drying method.

Second catalyst productivity improvement. All other things being equal, the inventive catalyst system may have greater catalytic activity per unit weight of catalyst system and/or greater polymer productivity rate (kilograms polymer produced per hour) than would a comparative modified Ziegler-Natta catalyst system having the same constituents except lacking ethanol modifier, lacking tetrahydrofuran modifier, or lacking both modifiers.

In some embodiments the inventive first and/or second catalyst productivity improvement of the inventive catalyst system independently is/are higher by at least 15%, alternatively at least 50%, alternatively at least 75%, alternatively at least 100%; and, in some embodiments, at most 200%, alternatively at most 150%, alternatively at most 110%, than the respective comparative catalyst productivity of the respective comparative catalyst system, respectively.

The inventive catalyst system has an improved composition and, optionally, an improved construction. Without wishing to be bound by theory, it is believed that the improved composition and, optionally, improved construction may be a reason for the inventive polyethylene composition having at least one improved property. In some embodiments the inventive modified spray-dried Ziegler-Natta catalyst system (e.g., the inventive modified spray-dried Ziegler-Natta catalyst system of Inventive Example 3 described later) and the inventive ethylene/alpha-olefin copolymer composition (e.g., an inventive ethylene/1-butene copolymer composition of Inventive Example (A) described later) made therewith according to the inventive polymerization method is characterized by at least one of the following normalized property values relative to a corresponding comparative ethylene/alpha-olefin copolymer composition (e.g., a comparative ethylene/1-butene copolymer of Comparative Example (A) described later), which is made with a comparative commercial UCAT™ J modified spray-dried Ziegler-Natta catalyst system of Comparative Example 1 described later according to a same polymerization method: (i) a normalized Elmendorf MD Tear of at least 110, alternatively at least 111; (ii) a normalized Elmendorf CD Tear of at least 120, alternatively at least 121; (iii) a normalized 2% MD Secant Modulus of at least 104; (iv) a normalized 2% CD Secant Modulus of at least 110, alternatively at least 111; (v) a normalized Dart Impact of at least 105; (vi) a normalized Gloss (45°) of at least 110, alternatively at least 120, alternatively at least 130, alternatively at least 135; (vii) a normalized Optical Haze of at most 90, alternatively at most 80, alternatively at most 75; (viii) a normalized Clarity of at least 110, alternatively at least 115; (ix) at least two of (i) to (viii); and (x) each of (i) to (viii). The foregoing unpredictable improvements are exemplified in Table 3 later.

In some embodiments the inventive clarity and/or gloss (45°) of an inventive film of the inventive ethylene/alpha-olefin copolymer composition may be increased, and/or the inventive optical haze of the film may be decreased, by at least 5%, alternatively by at least 10%, alternatively by at least 20%; and in some embodiments at most 30%, alternatively at most 25%, alternatively at most 21%, relative to a comparative clarity and/or gloss (45°) and or haze, respectively, of a comparative film of the comparative ethylene/ alpha-olefin copolymer composition.

Definitions.

Anhydrous: lacking $H_2O$ (i.e., having 0.00 wt % $H_2O$), alternatively having from >0.00 wt % to less than 0.05 wt %, alternatively less than 0.01 wt %, alternatively less than 0.001 wt % $H_2O$. Anhydrous form of material may be obtained from commercial sources or prepared by removing water from a water-containing form of the material using drying methods, which are well-known in the art.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Consisting essentially of, consist(s) essentially of, and the like. Partially-closed ended expressions that exclude anything that would affect the basic and novel characteristics of that which they describe, but otherwise allow anything else.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerize: polymerize a monomer or copolymerize a monomer and at least one comonomer.

Dry. Anhydrous. A moisture content from 0 to less than 5 parts per million based on total parts by weight. Materials fed to the reactor(s) during a polymerization reaction are dry.

Effective amount: a quantity sufficient to achieve an intended and appreciable beneficial result.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Fumed silica, hydrophobic pre-treated: a reaction product of contacting an untreated fumed silica with a hydrophobing agent to react with surface hydroxyl groups on the untreated fumed silica, thereby modifying the surface chemistry of the fumed silica to give a hydrophobic pre-treated fumed silica. The hydrophobing agent may be silicon based.

Fumed silica, untreated: pyrogenic silica produced in a flame. Consists of amorphous silica powder made by fusing microscopic droplets into branched, chainlike, three-dimensional secondary particles, which agglomerate into tertiary particles. Not quartz.

Hydrophobing agent: an organic or organosilicon compound that forms a stable reaction product with surface hydroxyl groups of fumed silica.

Induced condensing agent (ICA): An inert liquid useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Mesoporous: having an average pore diameter of from 2 to 50 nanometers (nm).

Microporous: having an average pore diameter of less than 2 nm.

Modifier: a composition that alters reactivity, stability, or both of a substance on which the composition acts.

Polyethylene: A macromolecule, or collection of macromolecules, composed of constitutional units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such constitutional units are derived from ethylene monomer; and, in aspects wherein there are less than 100 mol % ethylenic constitutional units, the remaining constitutional units are comonomeric units derived from at least one ($C_3$-$C_{20}$)alpha-olefin; or collection of such macromolecules.

(Pro)catalyst: a procatalyst, a catalyst, or a combination of procatalyst and catalyst.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

System: an interrelated arrangement of different chemical constituents so as to form a functioning whole.

Transport: movement from place to place. Includes from reactor to reactor, tank to reactor, reactor to tank, and manufacturing plant to storage facility and vice versa.

Ziegler-Natta (pro)catalysts and Ziegler-Natta (pro)catalyst systems. See Introduction for general descriptions. All of these forms generally fall into the heterogeneous class of Ziegler-Natta (pro)catalysts and systems because they constitute a solid phase in a gas- or liquid-phase olefin polymerization reaction.

Materials.

Activator. The activator may comprise a ($C_1$-$C_4$)alkyl-containing aluminum compound. The ($C_1$-$C_4$)alkyl-containing aluminium compound may independently contain 1, 2, or 3 ($C_1$-$C_4$)alkyl groups and 2, 1, or 0 groups each independently selected from chloride atom and ($C_1$-$C_4$)alkoxide. Each $C_1$-$C_4$)alkyl may independently be methyl; ethyl; propyl; 1-methylethyl; butyl; 1-methylpropyl; 2-methylpropyl; or 1,1-dimethylethyl. Each ($C_1$-$C_4$)alkoxide may independently be methoxide; ethoxide; propoxide; 1-methylethoxide; butoxide; 1-methylpropoxide; 2-methylpropoxide; or 1,1-dimethylethoxide. The ($C_1$-$C_4$)alkyl-containing aluminium compound may be triethylaluminum (TEA), triisobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), diethylaluminum ethoxide (DEAE), or ethylaluminum dichloride (EADC).

($C_3$-$C_{20}$)alpha-olefin. A compound of formula (I): $H_2C$=C(H)—R (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. Prior to treatment with the hydrophobing agent, the carrier material is untreated silica and has variable surface area and average particle size. In some embodiments, the surface area is from 50 to 150 square meter per gram ($m^2/g$). The average particle size may be less than 1 micrometer (μm). Each of the above properties are measured using conventional techniques known in the art. The untreated silica may be amorphous silica (not quartz), alternatively an amorphous silica, alternatively a fumed silica. Such silicas are commercially available from a number of sources. The silica may be in the form of spherical particles, which are obtained by a spray-drying process. The untreated silica may be calcined (i.e., dehydrated) or not calcined prior to treatment with the hydrophobing agent.

Ethylene: a compound of formula $H_2C$=$CH_2$.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of untreated fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Reducing agent. A material that is effective for chemically reducing the complex of $TiCl_3$ and $MgCl_2$ so as to make a chemical reduction product (Tired). The reducing agent may be used in a chemically reducing effective amount, which may be a quantity that is effective for forming the reduction product but insufficient for activating the same. The reducing agent may be a trialkylaluminum such as trihexylaluminum, a dialkylaluminum halide such as diethylaluminum chloride, or, typically, a combination of the trialkylaluminum and the dialkylaluminum halide such as a combination of trihexylaluminum and diethylaluminum chloride.

Modified spray-dried Ziegler-Natta (pro)catalyst systems. Generically includes modified spray-dried Ziegler-Natta procatalyst system, chemically-reduced, modified spray-dried Ziegler-Natta procatalyst system, and modified spray-dried Ziegler-Natta catalyst system. Although each form of the modified spray-dried Ziegler-Natta (pro)catalyst systems may have catalytic activity in olefin polymerization reactions, the activated form usually has much greater catalytic activity and polymer productivity than those of the respective unreduced procatalyst and reduced procatalyst precursors. All conditions being equal, the catalytic activity and polymer productivity of such reactions may vary from embodiment to embodiment of the modified spray-dried Ziegler-Natta (pro)catalyst system. Such variations are within the ordinary skill of an artisan to control and may depend upon the particular composition and construction of the modified spray-dried Ziegler-Natta (pro)catalyst system. The relevant composition factors include loadings of Ti and Mg and molar ratio of Mg to Ti ("mag-tie ratio"). The relevant construction factors include average primary particle size; primary particle size distribution; particle agglomeration; and particle or agglomerate shape of the Ziegler-Natta catalyst particles. The carrier material and catalyst system preparation method described above further define these construction factors.

The modified spray-dried Ziegler-Natta (pro)catalyst systems independently may be in the form of a dry powder or a suspension or slurry in a saturated and/or aromatic hydrocarbon solvent. The saturated and/or aromatic hydrocarbon solvent may aid handling of the (pro)catalyst system. The saturated and/or aromatic hydrocarbon solvent may be an alkane or an alkyl-substituted benzene (toluene or xylenes).

The modified spray-dried Ziegler-Natta (pro)catalyst systems independently may be made, prepared, reacted, reduced, activated, modified, handled, stored, and transported under conditions suitable for the particular purpose. Such conditions include reaction conditions, storage conditions and transportation conditions. Such conditions are generally well-known in the art. For example, the modified spray-dried Ziegler-Natta (pro)catalyst systems independently may be made, prepared, reacted, reduced, activated, modified, handled, stored, and transported under an inert atmosphere such as a gas composed of anhydrous $N_2$, He, and/or Ar; and/or in a saturated and/or aromatic hydrocarbon solvent such as those described herein. Such conditions may include well-known techniques for such systems such as Schlenk line techniques.

Polymerization Types.

The modified spray-dried Ziegler-Natta catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

Polymerization Reactors.

The polymerization may be conducted in a high pressure, liquid phase or gas phase polymerization reactor to yield the inventive polyethylene composition. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The modified spray-dried Ziegler-Natta catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Polymerization Conditions (Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene composition.

At least one, alternatively each of the (co)polymerizing conditions may be fixed (i.e., unchanged) during production of the inventive polyethylene composition. Such fixed (co) polymerizing conditions may be referred to herein as steady-state (co)polymerizing conditions. Steady-state (co)polymerizing conditions are useful for continuously making embodiments of the inventive polyethylene composition having same polymer properties.

Alternatively, at least one, alternatively two or more of the (co)polymerizing conditions may be varied within their defined operating parameters during production of the inventive polyethylene composition in order to transition from the production of a first embodiment of the inventive polyethylene composition having a first set of polymer properties to a non-inventive polyethylene composition or to a second embodiment of the inventive polyethylene composition having a second set of polymer properties, wherein the first and second sets of polymer properties are different and are each within the limitations described herein for the inventive polyethylene composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive polyethylene composition. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the inventive polyethylene composition may be achieved by a person of ordinary skill in the art in view of the teachings herein.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the polyethylene composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/C_2$), or hydrogen to comonomer ($H_2$/α-olefin) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as H2 and/or 02, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio Cx/C2 of comonomer and ethylene being fed into the FB-GPP reactor may be from 0.0001 to 0.1, alternatively from 0.0002 to 0.05, alternatively from 0.0004 to 0.02.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene (H2/C2) gas molar ratios in the FB-GPP reactor may be from 0.0001 to 0.25, alternatively from 0.0005 to 0.200, alternatively from 0.005 to 0.149, alternatively from 0.009 to 0.109, alternatively from 0.010 to 0.100.

Oxygen ($O_2$) concentration relative to ethylene ("$O_2/C_2$", volume parts $O_2$ per million volume parts ethylene (ppmv)) in the FB-GPP reactor. Typically, oxygen is not purposely introduced into the FB-GPP reactor. In some embodiments the FB-GPP reactor is substantially free or free of $O_2$, e.g., the $O_2/C_2$ is 0.0000 to 0.0001 ppmv, alternatively 0.0000 ppmv.

Reactor bed temperature in the FB-GPP reactor may be from 90° to 120° C., alternatively from 95° to 115° C., alternatively from 99° to 110° C., alternatively from 100.0° to 109° C., alternatively from 87.0° to 89° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Gas Phase Reactor and Polymerization Method Start-Up or Restart

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the modified spray-dried Ziegler-Natta catalyst system.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pa., USA. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C.

Catalyst productivity: calculated as kilograms (co)polymer resin made per kilogram of catalyst used ("kg copolymer/kg catalyst" or, simply, "kg/kg"). The calculation of kilogram of catalyst used is based on amount of titanium in polymer as measured by X-ray Fluorescence Spectrometry ("Ti IXRF") or by Inductively Coupled Plasma Optical Emission Spectrometry ("Ti ICPES"). Catalyst productivity may be expressed as a range from kg/kg (determined by Ti IXRF) to kg/kg (determined by Ti ICPES).

Clarity Test Method: ASTM D1746-15, *Standard Test Method for Transparency of Plastic Sheeting*. Results expressed percent (%) transmittance.

Dart Impact Test Method: measured according to ASTM D1709-16a, Standard Test Methods for Impact Resistance of Plastic Film by the Free-*Falling Dart Test Method*, Method A. Method A employs a dart with a 38.10±0,13-mm (1,500±0.005-in.) diameter hemispherical head dropped from a height of 0.66±0.01 m (26.0±0.4 in.). This test method can be used for films whose impact resistances require masses of about 50 g or less to about 6 kg to fracture them. Results expressed in grams (g).

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Elmendorf Tear Test Method: measured according to ASTM D1922-09, *Standard Test Methods for Propagation Tear Resistance of Plastic Film and Thin Sheeting by Pendulum Method*, Type B (constant radius). (Technically equivalent to ISO 6383-2.) Report results as normalized tear in cross direction (CD) or machine direction (MD) in gram-force (gf).

Film Puncture Test Method: ASTM D5748-95(2012), *Standard Test Method for Protrusion Puncture Resistance of Stretch Wrap Film*. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions. Results expressed in foot-pound force per cubic inch (ft*lbf/in$^3$).

Flow Index (190° C., 21.6 kg, "FI$_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kilograms (kg), "I$_5$") Test Method: for ethylene-based (co)polymer is measured according to ASTM D1238-13, using conditions of 190° C./5.0 kg, formerly known as "Condition E" and also known as I$_5$. Report results in units of grams eluted per 10 minutes (g/10 min.) or the equivalent in decigrams per 1.0 minute (dg/1 min.).

Flow Rate Ratio (190° C., "I$_{21}$/I$_5$") Test Method: calculated by dividing the value from the Flow Index I$_{21}$ Test Method by the value from the Flow Rate I$_5$ Test Method. Unitless.

Gel permeation chromatography (GPC) Method: Weight-Average Molecular Weight Test Method: determine M$_w$, number average molecular weight (M$_n$), and M$_w$/M$_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate M$_w$ and M$_n$ using universal calibration relationships with the column calibrations. Calculate MW at each elution volume with following equation:

$$\log M_X = \frac{\log(K_X / K_{PS})}{a_X + 1} + \frac{a_{PS} + 1}{a_X + 1} \log M_{PS},$$

where subscript "X" stands for the test sample, subscript "PS" stands for PS standards, $\alpha_{PS}=0.67$, $K_{PS}=0.000175$, and $\alpha_x$ and $K_x$ are obtained from published literature. For polyethylenes, $a_x/K_x=0.695/0.000579$. For polypropylenes $a_x/K_x=0.705/0.0002288$. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/dLog(MW) are as defined above.

Melt Flow Ratio (190° C., "$I_{21}/I_2$") Test Method: calculated by dividing the value from the Flow Index $I_{21}$ Test Method by the value from the Melt Index $I_2$ Test Method. Unitless.

Melt Index (190° C., 2.16 kilograms (kg), "$I_2$") Test Method: for ethylene-based (co)polymer is measured according to ASTM D1238-13, using conditions of 190° C./2.16 kg, formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Optical Gloss Test Method: ASTM D2457-13, *Standard Test Method for Specular Gloss of Plastic Films and Solid Plastics*. Measure specular gloss using a glassometer at incident angles 20°, 45°, 60°, or 75°. Specular gloss is unitless.

Optical Haze Test Method: ASTM D1003-13, *Standard Test Method for Haze and Luminous Transmittance of Transparent Plastics*. Measure haze using a hazemeter. Express haze as percentage of luminous transmission which in passing through the film deviates from an incident beam by forward scattering. Results expressed in percent (%).

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Tensile Modulus Test Method: measured according to ASTM D882-12, *Standard Test Methods for Tensile Properties of Thin Plastic Sheeting*. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Diethylaluminum chloride: obtained from Albemarle Corporation.

Ethanol, anhydrous: organic modifier; obtained from Pharmco Products.

Magnesium dichloride: a support material; obtained from SRC Worldwide Inc.

Magnesium metal chips (Grignard chips): Aldrich Chemical.

Hydrophobic fumed silica 1: a carrier material; a low surface area fumed silica that has been modified with dimethyldichlorosilane obtained as TS-610 from Cabot Corporation.

Tetrahydrofuran, anhydrous: an organic modifier; obtained from Pride Chemical Solution.

Titanium tetrachloride: obtained from WR Grace.

Titanium trichloride.AA: obtained from WR Grace.

Triethylaluminum: an activator; obtained from Albermarle or Akzo.

Trihexylaluminum: a reducing agent; obtained from Albermarle or Akzo. Also known is tri-n-hexylaluminum or TnHal.

1-butene ("C4"): comonomer; used at the molar ratio of C4/C2 in Tables 1 and 2.

Ethylene ("C2"): monomer; used at the partial pressure of C2 in Tables 1 and 2.

Isopentane: an induced condensing agent 1 ("ICA1"); used at the mole percent (mol %) concentration in the gas phase of a gas phase reactor relative to the total molar content of gas phase matter in Tables 1 and 2.

Molecular hydrogen gas ("H2"): used at a molar ratio of H2/C2 in Tables 1 and 2.

Inventive Example 1 (IE1) (prophetic): synthesis of a modified spray-dried Ziegler-Natta procatalyst system modified by tetrahydrofuran/ethanol 1:1 (wt/wt). Add anhydrous tetrahydrofuran (14 kilograms (kg)) to a feed tank. Next add TiCl$_4$ (530 grams (g)) and Mg metal (36 g). Heat the resulting solution to 60° C., and mix it for 1 hour, then add anhydrous ethanol (14 kg) to form a first solution. Then add finely-divided solid MgCl$_2$ (1340 g), and mix at 60° C. for 5 hours or overnight to dissolve the MgCl$_2$ and make a second solution. Once the MgCl$_2$ is dissolved, cool the second solution to 40° to 45° C. Then add hydrophobic pre-treated fumed silica (Cabosil TS-610, 1.7 kg) to give a suspension. Mix the suspension for 30 minutes to give a slurry of a modified Ziegler-Natta procatalyst system and hydrophobic pre-treated fumed silica. Spray the slurry in a spray dryer using the following conditions: inlet temperature 160 C, outlet temperature 110° C., feed rate approximately 45 kg per hour, total gas flow approximately 270 kg per hour, atomizer speed: varied typically approximately 85%, to give the modified spray-dried Ziegler-Natta procatalyst system of IE1, having expected d50 particle size from 18 to 25 micrometers.

Inventive Example 1a (IE1a): synthesis of a modified spray-dried Ziegler-Natta procatalyst system modified by tetrahydrofuran/ethanol 1:1 (wt/wt). Add anhydrous ethanol (14 kilograms (kg)) and anhydrous tetrahydrofuran (14 kg) to a feed tank. Next add finely-divided solid MgCl$_2$ (1255 g). Heat mixture to 60° C., and mix it for 5 hours to overnight to form a third solution. Cool third solution to 40° C. to 45° C. Then add TiCl$_3$.AA (459 g), and mix for 1 hour. Then add hydrophobic pre-treated fumed silica (Cabosil TS-610, 1.6 kg) to give a suspension. Mix the suspension for 30 minutes to give a slurry of a modified Ziegler-Natta procatalyst system and hydrophobic pre-treated fumed silica. The slurry has a blue color. Spray the slurry in a spray dryer using the spray-drying conditions of IE1 to give the modified spray-dried Ziegler-Natta procatalyst system of IE1a.

Inventive Example 2 (IE2, prophetic) or 2a (IE2a): synthesis of a chemically-reduced, modified spray-dried Ziegler-Natta procatalyst system modified by tetrahydrofuran/ethanol 1:1 (wt/wt). Contact the modified spray-dried Ziegler-Natta procatalyst system of IE1 (prophetic) or IE1a with a chemically reducing effective amount of a reagent mixture of 40 wt % trihexylaluminum (TnHAl) reducing agent in mineral oil in a 4 liter (L) volume mix tank for approximately 1 hour to give a reaction mixture, then add a reagent mixture of 12 wt % diethylaluminum chloride (DEAC) in mineral oil to the reaction mixture and mix for an additional 1 hour to give the chemically-reduced, modified spray-dried Ziegler-Natta catalyst system of IE2 (prophetic) or IE2a, respectively. The molar ratio of TnHAl to DEAC is approximately 0.875/1.000.

Comparative Example 1 (CE1): modified spray-dried Ziegler-Natta catalyst system. Replicate the synthesis of IE1 to IE2 (prophetic) or IE1a to IE2a except use an organic modifier consisting of tetrahydrofuran instead of THF/EtOH to give the modified spray-dried Ziegler-Natta catalyst system of CE1. A commercial UCAT™ J catalyst.

Inventive Example A (IE(A)): copolymerization of ethylene and 1-butene catalyzed by the modified spray-dried Ziegler-Natta catalyst system of IE2a to give an ethylene/1-butene copolymer composition. Produced the ethylene/1-butene copolymer composition of IE(A) in a single gas phase polymerization reactor with a capacity of producing 10 to 35 kg resin per hour. For an experimental run, preloaded the reactor before startup with a seedbed of granular resin inside. Dried down the reactor with the seedbed below 5 ppm moisture with high purity nitrogen. Then introduced reaction constituent gases, ethylene, hydrogen, and 1-butene, to the reactor to build a desired gas phase composition as shown below in Table 1. At the same time heated the reactor up to the desired temperature. Once the (co)polymerizing conditions were reached, injected a feed of activator triethylaluminum (TEAl) and injected a feed of a slurry of 17 wt % of the modified spray-dried Ziegler-Natta catalyst system of IE2a in mineral oil into the reactor. Used about 5 to 10 bed turnovers to reach steady-state production of the ethylene/1-butene copolymer composition, thereby giving the embodiment of the inventive ethylene/1-butene copolymer composition of IE(A). Collected the inventive ethylene/1-butene copolymer composition from the reactor's product discharge outlet.

Comparative Example A (CE(A)): copolymerization of ethylene and 1-butene catalyzed by a modified spray-dried Ziegler-Natta catalyst system of CE1 to give an ethylene/1-butene copolymer composition. Replicate Inventive Example A except use the commercial UCAT™ J modified spray-dried Ziegler-Natta catalyst system of CE1 containing tetrahydrofuran as organic modifier but lacking ethanol. Reactor and process conditions are listed later in Table 2. Collected the comparative ethylene/1-butene copolymer composition from the reactor's product discharge outlet.

Characterized the inventive ethylene/1-butene copolymer composition of IE(A) and the comparative ethylene/1-butene copolymer composition of CE(A) by MD-Stress @ Yield, CD-Stress @ Yield, Elmendorf MD Tear, Elmendorf CD Tear, 2% MD Secant Modulus, 2% CD Secant Modulus, Film Puncture, Dart Impact, Gloss (45°), Clarity, and optical haze using the aforementioned respective test methods. Normalized the comparative properties relative to same by reporting them as being equal to 100. Normalized the inventive properties relative to the corresponding comparative properties by dividing the inventive property values by the corresponding comparative property values, and multiplying the result by 100. The normalized property values are reported later in Table 3. For MD-Stress @ Yield, CD-Stress @ Yield, Elmendorf MD Tear, Elmendorf CD Tear, 2% MD Secant Modulus, 2% CD Secant Modulus, Film Puncture, Dart Impact, Gloss (45°), and Clarity, normalized values greater than 100 are an improvement versus 100. For optical haze, a normalized value of less than 100 is an improvement versus 100.

TABLE 1 gas phase copolymerization process/reactor conditions of IE(A).

| Reaction Constituent/Parameter | (co)polymerizing condition |
|---|---|
| Reactor | single, continuous-mode, fluidized bed |
| Starting seedbed weight | 50 kg |
| Starting seedbed composition = granular HDPE resin | Preloaded in reactor |
| Reactor Purging method | Anhydrous $N_2$ gas |
| Reaction pressure | 2410 kPa |
| Ethylene ("C2") partial pressure | 689 kPa |
| Comonomer = 1-butene molar ratio C4/C2 | 0.43 |
| Molecular hydrogen gas ("H2") molar ratio H2/C2 | 0.129 |
| Induced condensing agent 1: isopentane | 5.01 mol % |
| Operating reactor bed temperature | 88.0° C. |
| Superficial gas velocity (SGV, meters/second) | 0.50 m/s |
| Modified spray-dried Ziegler-Natta catalyst system | IE2a (THF/EtOH, 1:1) |
| Ti loading in catalyst system | 2.9 wt % |
| Al/Ti molar ratio | 29.3:1.0 |
| Catalyst Productivity (kg copolymer/kg catalyst) | 31,200 to 38,800 kg/kg |
| Polymer product residence time | 1.92 hours |
| Polymer production rate (kg/hour) | 24 kg/hr |

TABLE 2 gas phase copolymerization process/reactor conditions of CE(A).

| Reaction Constituent/Parameter | (co)polymerizing condition |
|---|---|
| Reactor | single, continuous-mode, fluidized bed |
| Starting seedbed weight | 50 kg |
| Starting seedbed composition = granular HDPE resin | Preloaded in reactor |
| Reactor Purging method | Anhydrous $N_2$ gas |
| Reaction pressure | 2410 kPa |
| Ethylene ("C2") partial pressure | 689 kPa |
| Comonomer = 1-butene molar ratio of C4/C2 | 0.39 |
| Molecular hydrogen gas ("H2") molar ratio H2/C2 | 0.150 |
| Induced condensing agent 1: isopentane | 4.01 mol % |
| Operating reactor bed temperature | 88.0° C. |
| Superficial gas velocity (SGV, meters/second) | 0.53 m/s |
| Modified spray-dried Ziegler-Natta catalyst system | CE1: Commercial UCAT ™ J (THF) |
| Ti loading in catalyst system | 2.27 wt % |
| Al/Ti molar ratio | 35.8:1.0 |
| Catalyst Productivity (kg copolymer/kg catalyst) | 14,600 to 19,200 kg/kg |
| Polymer product residence time | 2.34 hours |
| Polymer production rate (kg/hour) | 21 kg/hr |

As shown by the data in Tables 1 and 2, the inventive modified spray-dried Ziegler-Natta catalyst system of IE2a unpredictably had twice the catalyst productivity than that of the comparative modified spray-dried Ziegler-Natta catalyst system of CE1.

TABLE 3 properties of ethylene/1-butene copolymer
compositions of CE(A) and IE(A).

| Polymer Property Measured | CE(A) Result | IE(A) Result |
|---|---|---|
| Density (ASTM D792-13), g/cm$^3$ | 0.9178 | 0.9183 |
| Melt Index $I_2$ (190° C., 2.16 kg, ASTM D1238-04), g/10 min. | 2.13 | 2.06 |
| Flow Rate $I_5$ (190° C., 5.0 kg, ASTM D1238-04), g/10 min. | 6.06 | 5.96 |
| Flow Index $FI_{21}$ (190° C., 21.6 kg, ASTM D1238-04), g/10 min. | 55.6 | 56.2 |
| Melt Flow Ratio ($MI_{21}/M_2$) | 26.18 | 27.32 |
| Flow Rate Ratio ($MI_{21}/M_5$) | 9.19 | 9.43 |
| Number-average molecular weight ($M_n$), g/mol | 24,422 | 24,482 |
| Weight-average molecular weight ($M_w$), g/mol | 102,597 | 103,156 |
| Molecular mass dispersity ($M_w/M_n$), $Đ_M$ | 4.20 | 4.21 |
| Normalized MD-Stress @ Yield | 100 | 93 |
| Normalized CD-Stress @ Yield | 100 | 101 |
| Normalized Elmendorf MD Tear | 100 | 115 |
| Normalized Elmendorf CD Tear | 100 | 122 |
| Normalized 2% MD Secant Modulus | 100 | 105 |
| Normalized 2% CD Secant Modulus | 100 | 115 |
| Normalized Film Puncture | 100 | 100 |
| Normalized Dart Impact | 100 | 107 |
| Normalized Optical Haze | 100 | 73 |
| Normalized Gloss (45°) | 100 | 140 |
| Normalized Clarity | 100 | 118 |

As shown by the data in Table 3, the inventive ethylene/1-butene copolymer of IE(A), and by association the inventive modified spray-dried Ziegler-Natta catalyst system of IE2a, showed significant improvements in Elmendorf MD Tear, Elmendorf CD Tear, 2% MD Secant Modulus, 2% CD Secant Modulus, Dart Impact, Gloss (45°), Clarity, and optical haze versus the comparative ethylene/1-butene copolymer of CE(A), and the comparative commercial UCAT™ J modified spray-dried Ziegler-Natta catalyst system of CE1, respectively.

The invention claimed is:

1. A modified spray-dried Ziegler-Natta procatalyst system comprising a product of spray-drying a slurry of (A+) a modified Ziegler-Natta procatalyst system and (B) a hydrophobic pre-treated fumed silica; wherein the (A+) modified Ziegler-Natta procatalyst system comprises a complex of TiCl$_3$ and MgCl$_2$ and an effective amount of (C) a tetrahydrofuran/ethanol modifier, wherein the (C) tetrahydrofuran/ethanol modifier has a THF/EtOH weight/weight ratio of from 25:75 to 75:25.

2. The modified spray-dried Ziegler-Natta procatalyst system of claim 1 further described by any one or limitations (i) to (v): (i) the titanium complex is made from TiCl$_4$ and Mg metal; (ii) the titanium complex is made from TiCl$_3$.AA and MgCl$_2$; (iii) the (B) hydrophobic pre-treated fumed silica is a product of pre-treating an untreated fumed silica with a silicon-based hydrophobing agent; (iv) the hydrophobic pre-treated fumed silica is a product of pre-treating an untreated fumed silica with a silicon-based hydrophobing agent selected from trimethylsilyl chloride, dimethyldichlorosilane, a polydimethylsiloxane fluid, hexamethyldisilazane, an octyltrialkoxysilane, or a combination of any two or more thereof; and (v) both (ii) and (iv).

3. The modified spray-dried Ziegler-Natta procatalyst system of claim 2 wherein the silicon-based hydrophobing agent is octyltrimethoxysilane.

4. A method of making the modified spray-dried Ziegler-Natta procatalyst system of claim 1, the method comprising spray-drying the slurry of constituents (A+) and (B) to give the modified spray-dried Ziegler-Natta procatalyst system; wherein in the slurry the (C) tetrahydrofuran/ethanol modifier has a THF/EtOH weight/weight ratio of from 25:75 to 75:25.

5. A method of reducing a modified spray-dried Ziegler-Natta catalyst system, the method comprising contacting the modified spray-dried Ziegler-Natta procatalyst system of claim 1, with a reducing agent effective for chemically reducing a complex of TiCl$_3$ and MgCl$_2$, thereby giving a chemically-reduced, modified spray-dried Ziegler-Natta procatalyst system.

6. A chemically-reduced, modified spray-dried Ziegler-Natta procatalyst system prepared by the method of claim 5.

7. A method of activating a chemically-reduced, modified spray-dried Ziegler-Natta procatalyst system, the method comprising contacting the chemically-reduced, modified spray-dried Ziegler-Natta procatalyst system of claim 6 with an activator, thereby making a modified spray-dried Ziegler-Natta catalyst system.

8. A modified spray-dried Ziegler-Natta catalyst system made by the method of claim 7.

9. A method of making a polyethylene composition, the method comprising contacting ethylene monomer and optionally zero, one, or more ($C_3$-$C_{20}$)alpha-olefin comonomers with the modified spray-dried Ziegler-Natta catalyst system of claim 8 to give a polyethylene composition comprising a polyethylene homopolymer or ethylene/($C_3$-$C_{20}$)alpha-olefin copolymer, respectively, and the modified spray-dried Ziegler-Natta catalyst system, or a by-product thereof.

10. The method of claim 9 comprising a gas phase polymerization in the presence of molecular hydrogen gas ($H_2$) and, optionally, an induced condensing agent (ICA) in one, two or more gas phase polymerization reactors under (co)polymerizing conditions, thereby making the polyethylene composition; wherein the (co)polymerizing conditions comprise a reaction temperature from 80° C. to 110° C.; a molar ratio of the molecular hydrogen gas to the ethylene monomer ($H_2/C_2$ molar ratio) from 0.001 to 0.050; and a molar ratio of the or more ($C_3$-$C_{20}$)alpha-olefin comonomers to the ethylene monomer (comonomer/$C_2$ molar ratio) from 0.005 to 0.10.

* * * * *